(12) United States Patent
Lee et al.

(10) Patent No.: US 8,727,893 B2
(45) Date of Patent: May 20, 2014

(54) INTERACTIVE EXPERIENCE FULLY CONTAINED WITHIN AN EXPANDABLE EMBEDDED UNIT

(71) Applicant: Beintoo, S.p.A, Milan (IT)

(72) Inventors: Wonny H. Lee, Palisades Park, NJ (US); Lon E. Otremba, Douglaston, NY (US); Daniele B. Martinelli, Airmont, NY (US)

(73) Assignee: Beintoo, S.p.A., Milan (IT)

( * ) Notice: Subject to any disclaimer, the term of this patent is extended or adjusted under 35 U.S.C. 154(b) by 0 days.

(21) Appl. No.: 14/033,280

(22) Filed: Sep. 20, 2013

(65) Prior Publication Data

US 2014/0087883 A1    Mar. 27, 2014

Related U.S. Application Data

(60) Provisional application No. 61/704,194, filed on Sep. 21, 2012.

(51) Int. Cl.
*A63F 9/24*   (2006.01)
(52) U.S. Cl.
USPC ............................................. 463/42; 463/43
(58) Field of Classification Search
USPC .......................................... 463/42, 43, 25, 29
See application file for complete search history.

(56) References Cited

U.S. PATENT DOCUMENTS

| | | | |
|---|---|---|---|
| 8,099,109 B2 | 1/2012 | Altman et al. | |
| 8,472,985 B2 | 6/2013 | Karmarkar | |
| 2009/0197582 A1 | 8/2009 | Lewis et al. | |
| 2009/0227378 A1 | 9/2009 | Hillel et al. | |
| 2009/0292599 A1* | 11/2009 | Rampell et al. | 705/14.13 |
| 2009/0298480 A1 | 12/2009 | Khambete et al. | |
| 2010/0005001 A1 | 1/2010 | Aizen et al. | |
| 2010/0100446 A1 | 4/2010 | Kim | |
| 2010/0312670 A1* | 12/2010 | Dempsey | 705/27 |
| 2011/0125575 A1 | 5/2011 | Lasker et al. | |
| 2012/0157193 A1* | 6/2012 | Arezina et al. | 463/25 |
| 2012/0196676 A1 | 8/2012 | Login et al. | |
| 2013/0165215 A1* | 6/2013 | Arezina et al. | 463/25 |

FOREIGN PATENT DOCUMENTS

JP    2005-242339    9/2005

OTHER PUBLICATIONS

PCT/US2013/061005 International Search Report and Written Opinion dated Jan. 21, 2014.

* cited by examiner

*Primary Examiner* — Pierre E Elisca
(74) *Attorney, Agent, or Firm* — Wilson, Sonsini, Goodrich & Rosati

(57) ABSTRACT

Computer-implemented systems, computer-readable storage media encoded with software, and methods utilizing a first processing device configured to generate and deliver an ad for an online property, the ad delivered to an application executing on a second processing device, the ad providing an immersive interactive experience and tour of the online property in response to a user interaction, provided that the immersive interactive experience and tour of the online property are provided within the application executing on the second processing device.

18 Claims, 14 Drawing Sheets

INTERACTIVE EXPERIENCE FULLY CONTAINED WITHIN AN EXPANDABLE EMBEDDED UNIT

CROSS-REFERENCE TO RELATED APPLICATIONS

This application claims the benefit of U.S. Application Ser. No. 61/704,194, filed Sep. 21, 2012, which is hereby incorporated by reference in its entirety.

BACKGROUND OF THE INVENTION

According to IAB research, the mobile advertising market tripled in volume in 2011 ($1.6 billion in revenue) in comparison with 2010 ($600 million). eMarketer estimates that this trend will continue in 2012 and that U.S. mobile advertising spending will grow 80% to $2.61 billion.

eMarketer estimates U.S. mobile display ad spending, which includes spending on banner and rich media ads, will grow 93.5% to $861.7 million in 2012, after reaching $445.4 million in 2011. Mobile display ads are currently estimated to represent 33% of the U.S. mobile ad market and are this share is expected to grow in each of the next several years.

SUMMARY OF THE INVENTION

Despite rapid growth, however, mobile advertising accounted for less than 1% of total ad spending in the U.S. in 2011, according to eMarketer. A persistent problem is mobile application providers are currently unable to successfully implement monetization strategies for mobile users though advertising. Current embedded mobile ad units are disruptive to user experience because they merely link to mobile web pages, open another installed application, or provide links to download and install additional apps.

In contrast, the systems, software, and methods described herein provide an embedded mobile unit, which is expandable to provide access to an interactive game fully contained within the embedded unit. In some embodiments, the interactive game supports in-game micropayments, in-game ads, and/or in-game registrations to directly or indirectly provide revenue streams from the embedded mobile unit. In further embodiments, the unit is embedded in a mobile app or a mobile web page and provides the game without leaving its embedded environment. Advantages of the systems, software, and methods described herein include, but are not limited to, more engaging and effective mobile advertising and direct monetization of mobile ad units.

In one aspect, disclosed herein are computer-implemented systems comprising a first processing device configured to generate and deliver an ad for an online property, the ad delivered to an application executing on a second processing device, the ad providing an immersive interactive experience and tour of the online property in response to a user interaction, provided that the immersive interactive experience and tour of the online property are provided within the application executing on the second processing device. In some embodiments, the online property is a game. In further embodiments, the game is an action game, an adventure game, an arcade game, a board game, a brain game, a card game, a casino game, a dice game, a drawing game, an educational game, a music game, a puzzle game, a racing game, a role-playing game, a simulation, a social game, a sports game, a strategy game, a trivia game, a word game, or a combination thereof. In still further embodiments, the game comprises functionality to save game state and play information allowing a user to close the game and resume play at a later time. In still further embodiments, the game state and play information is saved to a remote server or database allowing a user to resume play from a different device or application. In some embodiments, the game supports in-game micropayments. In further embodiments, the in-game micropayments are for virtual items or events related to the mechanics of the game. In some embodiments, the game comprises periodic in-game ads. In some embodiments, the game comprises an in-game request for information. In further embodiments, the in-game request for information is a registration process. In some embodiments, the application executing on the second processing device is a web browser, a mobile web browser, or a native mobile application. In some embodiments, the immersive interactive experience is an ad unit. In further embodiments, the ad unit is an expanding banner ad, an interstitial ad, a three-dimensional multimedia ad, or a combination thereof. In some embodiments, the user interaction is made via a touchscreen and is selected from: touch, tap, swipe, double tap, reverse pinch, and shake. In some embodiments, the user interaction is made via a pointing device and is selected from: hover, click, drag, double click, and highlight. In some embodiments, the user interaction is made via a microphone and is a voice command. In some embodiments, the user interaction is made via a camera and is a gesture.

In another aspect, disclosed herein are computer-implemented methods comprising the steps of: generating, by a first processing device, an ad for an online property; and delivering, by the first processing device, the ad to an application executing on a second processing device, the ad providing an immersive interactive experience and tour of the online property in response to a user interaction; with the proviso that the immersive interactive experience and tour of the online property are provided within the application executing on the second processing device. In some embodiments, the online property is a game. In further embodiments, the game is an action game, an adventure game, an arcade game, a board game, a brain game, a card game, a casino game, a dice game, a drawing game, an educational game, a music game, a puzzle game, a racing game, a role-playing game, a simulation, a social game, a sports game, a strategy game, a trivia game, a word game, or a combination thereof. In still further embodiments, the game comprises functionality to save game state and play information allowing a user to close the game and resume play at a later time. In still further embodiments, the game state and play information is saved to a remote server or database allowing a user to resume play from a different device or application. In some embodiments, the game supports in-game micropayments. In further embodiments, the in-game micropayments are for virtual items or events related to the mechanics of the game. In some embodiments, the game comprises periodic in-game ads. In some embodiments, the game comprises an in-game request for information. In further embodiments, the in-game request for information is a registration process. In some embodiments, the application executing on the second processing device is a web browser, a mobile web browser, or a native mobile application. In some embodiments, the immersive interactive experience is an ad unit. In further embodiments, the ad unit is an expanding banner ad, an interstitial ad, a three-dimensional multimedia ad, or a combination thereof. In some embodiments, the user interaction is made via a touchscreen and is selected from: touch, tap, swipe, double tap, reverse pinch, and shake. In some embodiments, the user interaction is made via a pointing device and is selected from: hover, click, drag, double click, and highlight. In some embodiments, the user interaction is made via a microphone and is a voice command. In some embodiments, the user interaction is made via a camera and is a gesture.

In another aspect, disclosed herein are computer-readable storage media encoded with a computer program including instructions executable by a processor to create a mobile embeddable unit comprising a software module configured to expand the embeddable unit to provide an interactive mobile game in response to a user interaction, the game occupying at least 50 percent of the available area of a mobile display, provided that the game comprises a software module configured to transact in-game mobile micropayments. In some embodiments, the mobile embeddable unit is an ad unit. In further embodiments, the mobile ad unit comprises text, an image, a video, an interactive, or a combination thereof. In some embodiments, the user interaction is made via a touchscreen and is selected from: touch, tap, swipe, double tap, reverse pinch, and shake. In some embodiments, the user interaction is made via a pointing device and is selected from: hover, click, drag, double click, and highlight. In some embodiments, the user interaction is made via a microphone and is a voice command. In some embodiments, the user interaction is made via a camera and is a gesture. In some embodiments, the software module configured to expand the ad unit to provide an interactive mobile game provides the game without linking to a web page or downloading a mobile application. In some embodiments, the interactive mobile game occupies at least 70 percent of the available area of a mobile display. In further embodiments, the interactive mobile game occupies at least 90 percent of the available area of a mobile display. In still further embodiments, the interactive mobile game is full screen. In still further embodiments, the interactive mobile game is closable to reveal the mobile ad unit. In some embodiments, the interactive mobile game is an action game, an adventure game, an arcade game, a board game, a brain game, a card game, a casino game, a dice game, a drawing game, an educational game, a music game, a puzzle game, a racing game, a role-playing game, a simulation, a social game, a sports game, a strategy game, a trivia game, a word game, or a combination thereof. In further embodiments, the interactive mobile game comprises levels of play. In further embodiments, the interactive mobile game comprises at least one animated character. In further embodiments, the interactive mobile game comprises functionality to save game state and play information allowing a user to close the game and resume play at a later time. In still further embodiments, the game state and play information is saved to a remote server or database allowing a user to resume play from a different device or application. In some embodiments, the in-game micropayments are for virtual items or events related to the mechanics of the game. In some embodiments, the in-game micropayments are transacted by one or more of: electronic fund transfer, credit, debit, virtual wallet, PayPal, and virtual currency transfer. In some embodiments, the interactive mobile game comprises periodic in-game ads. In some embodiments, the interactive mobile game comprises an in-game request for information. In further embodiments, the in-game request for information is a registration process.

In another aspect, disclosed herein are computer-implemented systems comprising: a mobile digital processing device comprising an operating system configured to perform executable instructions and a memory device; and a computer program including instructions executable by the digital processing device to create a mobile application comprising a software module configured to provide a mobile embeddable unit, the embeddable unit expandable in response to a user interaction to provide an interactive mobile game, the game occupying at least 50 percent of the available area of the mobile digital processing device display, with the proviso that the game comprises a software module configured to transact in-game mobile micropayments. In some embodiments, the mobile embeddable unit is an ad unit. In further embodiments, the mobile ad unit comprises text, an image, a video, an interactive, or a combination thereof. In some embodiments, the user interaction is made via a touchscreen and is selected from: touch, tap, swipe, double tap, reverse pinch, and shake. In some embodiments, the user interaction is made via a pointing device and is selected from: hover, click, drag, double click, and highlight. In some embodiments, the user interaction is made via a microphone and is a voice command. In some embodiments, the user interaction is made via a camera and is a gesture. In some embodiments, the software module configured to provide an interactive mobile game provides the game without linking to a web page or downloading a mobile application. In some embodiments, the interactive mobile game occupies at least 70 percent of the available area of the mobile digital processing device display. In further embodiments, the interactive mobile game occupies at least 90 percent of the available area of the mobile digital processing device display. In still further embodiments, the interactive mobile game is full screen. In still further embodiments, the interactive mobile game is closable to reveal the mobile ad unit. In some embodiments, the interactive mobile game is an action game, an adventure game, an arcade game, a board game, a brain game, a card game, a casino game, a dice game, a drawing game, an educational game, a music game, a puzzle game, a racing game, a role-playing game, a simulation, a social game, a sports game, a strategy game, a trivia game, a word game, or a combination thereof. In further embodiments, the interactive mobile game comprises levels of play. In further embodiments, the interactive mobile game comprises at least one animated character. In further embodiments, the interactive mobile game comprises functionality to save game state and play information allowing a user to close the game and resume play at a later time. In still further embodiments, the game state and play information is saved to a remote server or database allowing a user to resume play from a different device or application. In some embodiments, the in-game micropayments are for virtual items or events related to the mechanics of the game. In some embodiments, the in-game micropayments are transacted by one or more of: electronic fund transfer, credit, debit, virtual wallet, PayPal, and virtual currency transfer. In some embodiments, the interactive mobile game comprises periodic in-game ads. In some embodiments, the interactive mobile game comprises an in-game request for information. In further embodiments, the in-game request for information is a registration process.

In another aspect, disclosed herein are computer-readable storage media encoded with a computer program including instructions executable by a processor to create an interactive mobile game, the game fully contained in a mobile embeddable unit, the embeddable unit expandable in response to a user interaction to provide the game, the game occupying at least 50 percent of the available area of a mobile display, provided that the game comprises a software module configured to transact in-game mobile micropayments. In some embodiments, the mobile embeddable unit is an ad unit. In further embodiments, the mobile ad unit comprises text, an image, a video, an interactive, or a combination thereof. In some embodiments, the user interaction is made via a touchscreen and is selected from: touch, tap, swipe, double tap, reverse pinch, and shake. In some embodiments, the user interaction is made via a pointing device and is selected from:

hover, click, drag, double click, and highlight. In some embodiments, the user interaction is made via a microphone and is a voice command. In some embodiments, wherein the user interaction is made via a camera and is a gesture. In some embodiments, the mobile ad unit provides the interactive mobile game without linking to a web page or downloading a mobile application. In some embodiments, the interactive mobile game occupies at least 70 percent of the available area of a mobile display. In further embodiments, the interactive mobile game occupies at least 90 percent of the available area of a mobile display. In still further embodiments, the interactive mobile game is full screen. In still further embodiments, the interactive mobile game is closable to reveal the mobile ad unit. In some embodiments, the interactive mobile game is an action game, an adventure game, an arcade game, a board game, a brain game, a card game, a casino game, a dice game, a drawing game, an educational game, a music game, a puzzle game, a racing game, a role-playing game, a simulation, a social game, a sports game, a strategy game, a trivia game, a word game, or a combination thereof. In further embodiments, the interactive mobile game comprises levels of play. In further embodiments, the interactive mobile game comprises at least one animated character. In further embodiments, the interactive mobile game comprises functionality to save game state and play information allowing a user to close the game and resume play at a later time. In still further embodiments, the game state and play information is saved to a remote server or database allowing a user to resume play from a different device or application. In some embodiments, the in-game micropayments are for virtual items or events related to the mechanics of the game. In some embodiments, the in-game micropayments are transacted by one or more of: electronic fund transfer, credit, debit, virtual wallet, PayPal, and virtual currency transfer. In some embodiments, the interactive mobile game comprises periodic in-game ads. In some embodiments, the interactive mobile game comprises an in-game request for information. In further embodiments, the in-game request for information is a registration process.

In another aspect, disclosed herein are computer-implemented systems comprising: a mobile digital processing device comprising an operating system configured to perform executable instructions and a memory device; and a computer program including instructions executable by the digital processing device to create an interactive mobile game, the game fully contained in a mobile embeddable unit, the embeddable unit expandable in response to a user interaction to provide the game, the game occupying at least 50 percent of the available area of a mobile display, with the proviso that the game comprises a software module configured to transact in-game mobile micropayments. In some embodiments, the mobile embeddable unit is an ad unit. In further embodiments, the mobile ad unit comprises text, an image, a video, an interactive, or a combination thereof. In some embodiments, the user interaction is made via a touchscreen and is selected from: touch, tap, swipe, double tap, reverse pinch, and shake. In some embodiments, the user interaction is made via a pointing device and is selected from: hover, click, drag, double click, and highlight. In some embodiments, the user interaction is made via a microphone and is a voice command. In some embodiments, the user interaction is made via a camera and is a gesture. In some embodiments, the mobile ad unit provides the interactive mobile game without linking to a web page or downloading a mobile application. In some embodiments, the interactive mobile game occupies at least 70 percent of the available area of the mobile digital processing device display. In further embodiments, the interactive mobile game occupies at least 90 percent of the available area of the mobile digital processing device display. In still further embodiments, the interactive mobile game is full screen. In still further embodiments, the interactive mobile game is closable to reveal the mobile ad unit. In some embodiments, the interactive mobile game is an action game, an adventure game, an arcade game, a board game, a brain game, a card game, a casino game, a dice game, a drawing game, an educational game, a music game, a puzzle game, a racing game, a role-playing game, a simulation, a social game, a sports game, a strategy game, a trivia game, a word game, or a combination thereof. In further embodiments, the interactive mobile game comprises levels of play. In further embodiments, the interactive mobile game comprises at least one animated character. In further embodiments, the interactive mobile game comprises functionality to save game state and play information allowing a user to close the game and resume play at a later time. In still further embodiments, the game state and play information is saved to a remote server or database allowing a user to resume play from a different device or application. In some embodiments, the in-game micropayments are for virtual items or events related to the mechanics of the game. In some embodiments, the in-game micropayments are transacted by one or more of: electronic fund transfer, credit, debit, virtual wallet, PayPal, and virtual currency transfer. In some embodiments, the interactive mobile game comprises periodic in-game ads. In some embodiments, the interactive mobile game comprises an in-game request for information. In further embodiments, the in-game request for information is a registration process.

DETAILED DESCRIPTION OF THE INVENTION

Figure 1:
FIG. 1 shows a non-limiting example of a mobile application environment; in this case, a mobile application for social networking.

Current embedded mobile units are disruptive to the mobile user experience and fail to adequately monetize mobile user experiences though advertising. Accordingly, described herein, in certain embodiments, are computer-implemented systems comprising a first processing device configured to generate and deliver an ad for an online property, the ad delivered to an application executing on a second processing device, the ad providing an immersive interactive experience and tour of the online property in response to a user interaction, provided that the immersive interactive experience and tour of the online property are provided within the application executing on the second processing device.

Also described herein, in certain embodiments, are computer-implemented methods comprising the steps of: generating, by a first processing device, an ad for an online property; and delivering, by the first processing device, the ad to an application executing on a second processing device, the ad providing an immersive interactive experience and tour of the online property in response to a user interaction; with the proviso that the immersive interactive experience and tour of the online property are provided within the application executing on the second processing device.

Also described herein, in certain embodiments, are computer-readable storage media encoded with a computer program including instructions executable by a processor to create a mobile embeddable unit comprising a software module configured to expand the embeddable unit to provide an interactive mobile game in response to a user interaction, the game occupying at least 50 percent of the available area of a mobile display, provided that the game comprises a software module configured to transact in-game mobile micropayments.

Also described herein, in certain embodiments, are computer-implemented systems comprising: a mobile digital processing device comprising an operating system configured to perform executable instructions and a memory device; and a computer program including instructions executable by the digital processing device to create a mobile application comprising a software module configured to provide a mobile embeddable unit, the embeddable unit expandable in response to a user interaction to provide an interactive mobile game, the game occupying at least 50 percent of the available area of the mobile digital processing device display, with the proviso that the game comprises a software module configured to transact in-game mobile micropayments.

Also described herein, in certain embodiments, are computer-readable storage media encoded with a computer program including instructions executable by a processor to create an interactive mobile game, the game fully contained in a mobile embeddable unit, the embeddable unit expandable in response to a user interaction to provide the game, the game occupying at least 50 percent of the available area of a mobile display, provided that the game comprises a software module configured to transact in-game mobile micropayments.

Also described herein, in certain embodiments, are computer-implemented systems comprising: a mobile digital processing device comprising an operating system configured to perform executable instructions and a memory device; and a computer program including instructions executable by the digital processing device to create an interactive mobile game, the game fully contained in a mobile embeddable unit, the embeddable unit expandable in response to a user interaction to provide the game, the game occupying at least 50 percent of the available area of a mobile display, with the proviso that the game comprises a software module configured to transact in-game mobile micropayments.

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Ad for an Online Property

In some embodiments, the systems, software, and methods described herein include an ad for an online property, or use of the same. In further embodiments, the systems, software, and methods described herein include a processor configured (e.g., by a software module, etc.) to generate and deliver an ad for an online property, or use of the same. In still further embodiments, the ad for an online property is delivered to an application executing on a distinct processing device. In still further embodiments, the ad for an online property is delivered to a plurality of processing devices (e.g., a network of processing devices).

In some embodiments, the ad for an online property provides a tour of the online property. Many online properties are suitable. In various embodiments, suitable online properties include, by way of non-limiting examples, web applications, web pages, web sites, videos, multimedia, games, and the like. Similarly, many tours are suitable. In various embodiments, suitable tours include, by way of non-limiting examples, animated tours, video tours, three-dimensional tours, interactive tours, multimedia tours, and the like. In some embodiments, the ad for an online property provides an immersive interactive experience. Many immersive interactive experiences are suitable. In some embodiments, an immersive experience is one that deeply engages a user's senses and attention. In some embodiments, an interactive experience is one that reacts to input from a user. In various embodiments, suitable immersive interactive experiences include, by way of non-limiting examples, multimedia, three-dimensional elements, applications, video elements, games, and the like. In some embodiments, the ad for an online property provides a tour of the online property and an immersive interactive experience. In further embodiments, the ad for an online property provides a tour of the online property and/or an immersive interactive experience in response to a user interaction described further herein.

In some embodiments, the immersive interactive experience comprises a mobile embeddable unit. In further embodiments, the mobile embeddable unit comprises a mobile ad unit. In still further embodiments, the ad unit is an expanding banner ad, an interstitial ad, a three-dimensional multimedia ad, or a combination thereof.

In various embodiments, an ad for an online property, a mobile embeddable unit, and/or a mobile ad unit is expandable. In some embodiments, an ad for an online property, a mobile embeddable unit, and/or a mobile ad unit is expandable in response to a user interaction described further herein. In further embodiments, an ad for an online property, a mobile embeddable unit, and/or a mobile ad unit is expandable to provide a tour of an online property and/or an immersive interactive experience. In still further embodiments, an ad for an online property, a mobile embeddable unit, and/or a mobile ad unit is expandable to provide an interactive mobile game.

In various embodiments, an ad for an online property, a mobile embeddable unit, and/or a mobile ad unit is expandable to occupy 20, 25, 30, 35, 40, 45, 50, 55, 60, 65, 70, 75, 80, 85, 90, 91, 92, 93, 94, 95, 96, 97, 98, or 99 percent of the available area of a mobile display, including increments therein. In some embodiments, an online property, a mobile embeddable unit, and/or a mobile ad unit is expandable to occupy all of the available area of a mobile display.

In some embodiments, the immersive interactive experience and/or tour of the online property are provided entirely within the application executing on a processing device. In further embodiments, an ad for an online property, a mobile embeddable unit, and/or a mobile ad unit do not merely link to mobile web pages, open another installed application, or provide links to download and install additional apps to provide a tour of the online property and/or an immersive interactive experience. In still further embodiments, a tour of the online property and/or an immersive interactive experience is completely contained within an ad for an online property, a mobile embeddable unit, and/or a mobile ad unit.

Referring to FIG. 1, in a particular embodiment, a mobile application for social networking includes an ad for an online property in the form of an embedded mobile ad unit.

Figure 2:
FIG. 2 shows a non-limiting example of a mobile embedded unit; in this case, a mobile ad unit (e.g., ad for an online property) embedded in a mobile application environment.

Referring to FIG. 2, in a particular embodiment, a mobile application for social networking includes a user navigation menu. In this embodiment, the menu of includes an ad for an online property in the form of an embedded mobile ad unit. In this embodiment, the online property is an interactive mobile game. The ad unit provides the interactive mobile game, which is fully contained within the ad unit.

Figure 3:
FIG. 3 shows a non-limiting example of a mobile ad unit (e.g., ad for an online property); in this case, a mobile ad unit expanded in response to a user interaction to provide an immersive interactive experience (e.g., interactive game).

Referring to FIG. 3, in a particular embodiment, a user has interacted with (e.g., tapped, touched, etc.) the embedded mobile ad unit triggering the unit to expand to fill the majority of the available real estate of the display of the mobile device. In this embodiment, only the top navigation menu of the hosting mobile application is visible. Further in this embodiment, the embedded mobile ad unit provides an interactive mobile game; in this case, a political game.

Interactive Mobile Game

In some embodiments, the systems, software, and methods described herein include an ad for an online property, the ad providing an immersive interactive experience, or use of the same. In further embodiments, the online property and/or the immersive interactive experience is an interactive game. In some embodiments, the systems, software, and methods described herein include a mobile embeddable unit provide an interactive mobile game.

Many interactive games are suitable. In various embodiments, suitable games include, by way of non-limiting examples, action games, adventure games, arcade games, board games, brain games, card games, casino games, dice games, drawing games, educational games, music games, puzzle games, racing games, role-playing games, simulations, social games, sports games, strategy games, trivia games, word games, and combinations thereof.

In some embodiments, the interactive game is a complex game designed to engage a user's attention for an extended period. In further embodiments, the interactive game comprises multiple levels of play. In various embodiments, the interactive game comprises 2, 3, 4, 5, 6, 7, 8, 9, 10, 20, 30, 40, 50, 60, 70, 80, 90, 100, or more levels of play, including increments therein. In further embodiments, the interactive game comprises at least one animated character. In further embodiments, the interactive game comprises functionality to save game state and play information allowing a user to close the game and resume play at a later time. In further embodiments, the game state and play information is saved to a remote server or database allowing a user to resume play from a different device or application.

In some embodiments, the interactive game comprises a software module to support in-game micropayments described further herein. In further embodiments, the in-game micropayments allow a user to purchase virtual items related to the mechanics of the game. Many virtual items are suitable for purchase via in-game micropayment by a user. In various embodiments, suitable virtual items include, by way of non-limiting examples, credit, venues, characters, avatars, avatar accessories (e.g., features, clothing, etc.), lives, weapons, spells, lives, and the like. In still further embodiments, the in-game micropayments allow a user to purchase events related to the mechanics of the game. Many events are suitable for purchase via in-game micropayment by a user. In various embodiments, suitable events include, by way of non-limiting examples, continued play, additional time, power ups, level skips, extra tries, help/hints/progress, new games, and the like.

Figure 4:
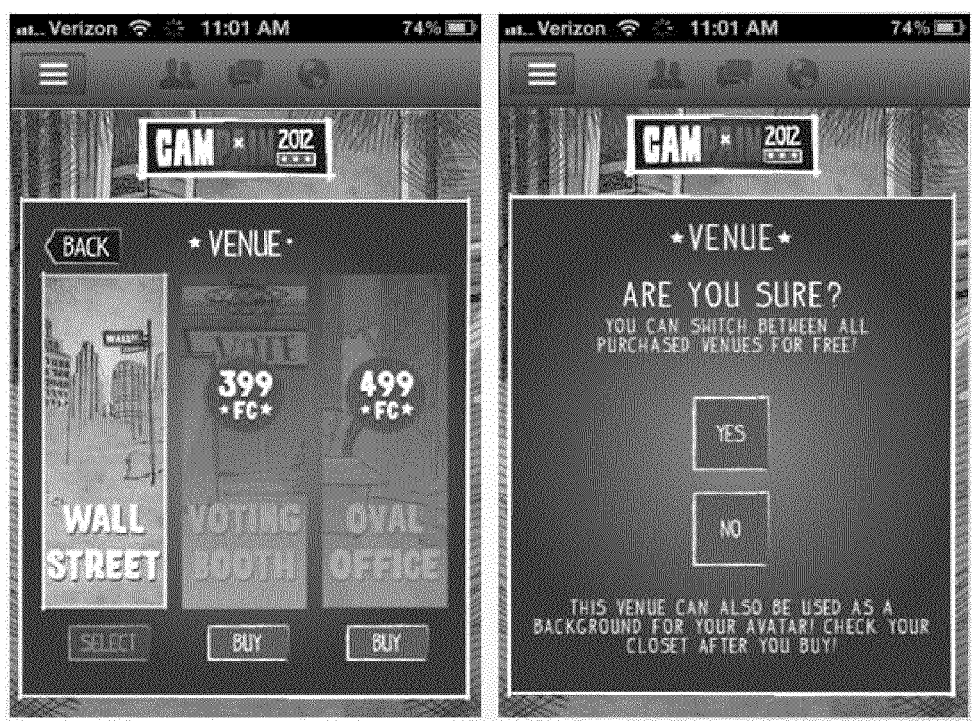
FIG. 4 shows a non-limiting example of an interactive game; in this case, an interactive game fully contained within an embedded mobile ad unit and supporting in-game micropayments.

Referring to FIG. 4, in a particular embodiment, an ad for an online property in the form of an embedded mobile ad unit provides a fully contained immersive interactive experience in the form of a mobile game. In this embodiment, the game allows users to purchase additional venues for game play via in-game micropayments.

Figure 5:
FIG. 5 shows another non-limiting example of an interactive game; in this case, an interactive game fully contained within an embedded mobile ad unit.

Referring to FIG. 5, in a particular embodiment, an ad for an online property in the form of an embedded mobile ad unit provides a fully contained immersive interactive experience in the form of a mobile game. In this embodiment, the game is a puzzle game.

User Interactions

In some embodiments, the systems, software, and methods described herein include an ad for an online property that provides a tour of the online property and/or an immersive interactive experience in response to a user interaction, or use of the same. In some embodiments, the systems, software, and methods described herein include an ad for an online property, a mobile embeddable unit, and/or a mobile ad unit, which is expandable in response to a user interaction. Many modes of user interaction, types of user interaction, and input devices are suitable.

In some embodiments, a user interacts with an ad for an online property, a mobile embeddable unit, and/or a mobile ad unit using a pointing device including, by way of non-limiting examples, a mouse, trackball, trackpad, joystick, pen, or stylus. In further embodiments, a user interacts using a pointing device by actions including, by way of non-limiting examples, hover, click, click and hold, double click, right click, shift-click, control-click, command-click, alt-click, drag, draw, and highlight. In some embodiments, a user interacts with an ad for an online property, a mobile embeddable unit, and/or a mobile ad unit using a touch screen display or multi-touch screen display. In further embodiments, a user interacts using a touch screen or multi-touch screen by gestures including, by way of non-limiting examples, tap (e.g., touch), double tap, tap and hold, swipe, drag, pinch, reverse pinch, draw, and highlight. In some embodiments, a user interacts with an ad for an online property, a mobile embeddable unit, and/or a mobile ad unit using a keyboard, keypad, or alternative text input device, by keystroke, combination of keystrokes, or sequence of keystrokes. In other embodiments, a user interacts with an ad for an online property, a mobile embeddable unit, and/or a mobile ad unit using a microphone to capture voice commands or other sound input. In other embodiments, a user interacts with an ad for an online property, a mobile embeddable unit, and/or a mobile ad unit using a video camera to capture motion, gestures, or other visual input.

Micropayments

In some embodiments, the systems, software, and methods described herein include an ad for an online property providing an immersive interactive experience and tour of the online property in response to a user interaction, or use of the same. In further embodiments, the immersive interactive experience and/or tour of the online property is an interactive mobile game. In some embodiments, the systems, software, and methods described herein include mobile embeddable unit providing an interactive mobile game in response to a user interaction, or use of the same. In some embodiments, the game offers in-game mobile micropayments. In further embodiments, the in-game micropayments are for virtual items or events related to the mechanics of the game described further herein.

Many types of micropayment transactions are suitable. In various embodiments, the in-game micropayments are transacted by, for example, electronic fund transfer, credit, debit, virtual wallet, PayPal, and virtual currency transfer. Similarly, many types of virtual currency are suitable including, electronic money, fictional currency, Internet currency, and the like. For example, in some embodiments, Bitcoin is suitable for in-game micropayments.

Other Monetization Features

In some embodiments, the systems, software, and methods described herein include an ad for an online property providing an immersive interactive experience and tour of the online property in response to a user interaction, or use of the same. In further embodiments, the immersive interactive experience and/or tour of the online property is an interactive mobile game. In some embodiments, the systems, software, and methods described herein include mobile embeddable unit providing an interactive mobile game in response to a user interaction, or use of the same.

In some embodiments, the game includes one or more periodic in-game ads. In some embodiments, the display of an in-game ad halts or pauses game play. In other embodiments, the display of an in-game ad does not halt or pause game play. In further embodiments, an in-game ad is integrated into game play. Many time intervals are suitable for the display of periodic in-game ads. In various embodiments, suitable time intervals include, by way of non-limiting examples, 15, 20, 25, 30, 35, 40, 45, 50, 55, 60, or more seconds, including increments therein. In various embodiments, suitable time intervals include, by way of non-limiting examples, 1, 2, 3, 4, 5, 6, 7, 8, 9, 10, 11, 12, 13, 14, 15, 16, 17, 18, 19, 20, or more minutes, including increments therein. Many types of in-game ads are suitable including, by way of non-limiting examples, text, graphics, video, audio, multimedia, banner ads, product placements, and the like. In some embodiments, the periodicity is fixed. In other embodiments, the periodicity is variable. In yet other embodiments, the periodicity is random.

In some embodiments, the game includes one or more in-game request for information. In further embodiments, the in-game request for information is a request for user registration. In some embodiments, an in-game request for information is displayed upon reaching a particular duration of game play, a particular number of games played, or a particular level of achievement in game play. In some embodiments, the in-game request for information is made periodically until a user registers.

Figure 6:
FIG. 6 shows a non-limiting example of an interactive game; in this case, an interactive game providing an in-game request for information.

Referring to FIG. 6, in a particular embodiment, an ad for an online property in the form of an embedded mobile ad unit provides a fully contained immersive interactive experience in the form of a mobile game. In this embodiment, the game requests registration from user.

Figure 7:
FIG. 7 shows a non-limiting example of an in-game request for information; in this case, an in-game request for information in the form of a registration process.

Referring to FIG. 7, in a particular embodiment, a mobile game described herein offers a registration process including requests for name, birth date, gender, location, and email. In some embodiments, a user may register by providing registration credentials to other well-known applications. In this embodiment, a user registers with Facebook credentials.

Figure 8:
FIG. 8 shows a non-limiting example of a thank you screen; in this case, a thank you screen provided upon completion of an in-game registration process.

Referring to FIG. 8, in a particular embodiment, a mobile game described herein offers a thank you screen upon successful registration.

Figure 9:
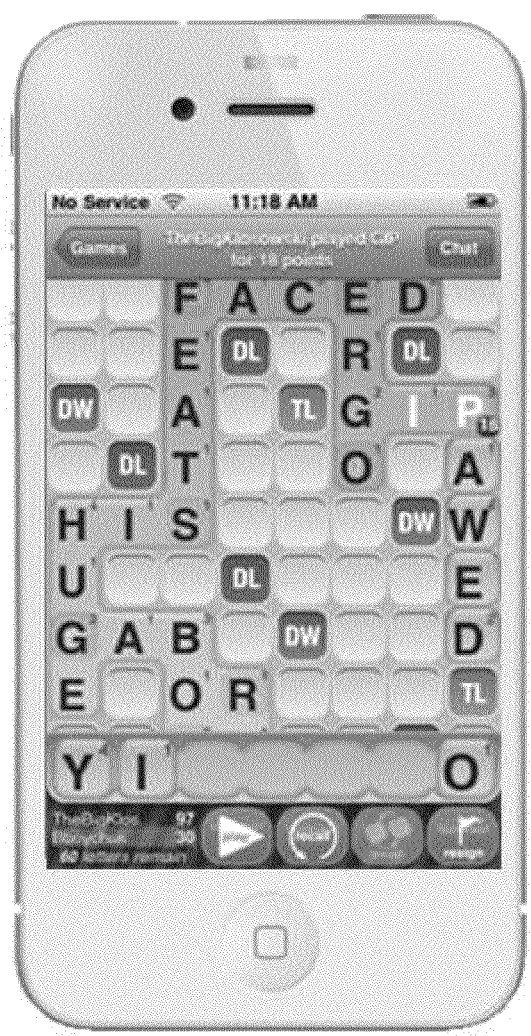
FIG. 9 shows a non-limiting example of an interactive game fully contained within an embedded mobile ad unit; in this case, an interactive game as it appears upon completion of an in-game registration process.

Referring to FIG. 9, in a particular embodiment, a mobile game described herein resumes game play upon successful registration.

Particular Exemplary Embodiments

In some embodiments, the systems, software, and methods described herein allow to delivery of games into advertising units (e.g., mobile, web, etc.), in order to provide a new user friendly kind of advertising. Many technologies are suitable to deploy the subject matter described herein. In particular embodiments, the technology is HTML 5 and Javascript-based. The subject matter described herein is suitably deployed in a wide variety of environments. For example, in some embodiments, the systems, software, and methods described herein provide a mobile technology, developed for and tested on the iOS and Android operative systems. In particular embodiments, the technology is deployed to allow delivery of games into mobile advertising units placed into mobile applications. In various embodiments, the technology performs well when deployed in non-game apps, for example music discovery or listening apps, where users are not over-exposed to ad units.

In some embodiments, the main purpose of the systems, software, and methods described herein is to promote a brand during the entirety of a user's experience in the ad unit. In further embodiments, each brand is identified by an API key. In some embodiments, deploying the technology described herein (e.g., running an advertising campaign) requires integrating a few lines of Javascript code and a URL that builds the content of the unit into the webview of the ad. In further embodiments, a campaign is identified by its brand, through the API key.

In some embodiments, the systems, software, and methods described herein utilize a webview in which to be delivered. In further embodiments, the technology provided herein is MRAID 1.0 complaint, in order to be operable on the ad networks that conform to this standard. In particular further embodiments, the technology provided herein is compliant with Pandora and its webview PandoraApp object.

In some embodiments, the systems, software, and methods described herein comprise a starting ad unit (e.g., a starting banner ad, etc.), which upon detecting a user interaction, such as a tap event, expands to present a game within the starting ad unit. In further embodiments, upon expansion, the starting banner is optionally any of the standard formats including, by way of non-limiting examples, 320×50 px, 300×250 px, etc. In some embodiments, the ad unit expands to a size determined by the size of the game presented. In further embodiments, the game unit requires a 320×350 px size. In still further embodiments, the game unit requires 320×310 px for the game itself and 320×40 px for the advertised brand's logo.

In various embodiments, the systems, software, and methods described herein include three different process flows, each offering a different user experience.

Exemplary Flow 1: Download Incentive

In some embodiments, the process flow includes a starting banner that invites the user to tap to play a game. In further embodiments, the game, once loaded into the ad unit, allows the user to interact by touch events. In still further embodiments, when the game ends, the user lands on one of three different pages based on his score, for example, Game Over, Level Up, or Winner pages. In particular embodiments, each one of these pages presents to the user a "Download" button link to the brand's app (e.g., the brand being advertised). In such embodiments, the user optionally chooses to restart, play the next level, or restart the game from the beginning Exemplary Flow 2: Virtual Currency In some embodiments, the process flow is the same as flow 1, except for the fact that the landing page gives virtual currency (e.g., Bedollars, etc.) to the user. In further embodiments, the user is eventually is asked to enter an email address to collect the provided virtual currency (if the address wasn't already registered). In further embodiments, the user optionally collects virtual currency for their game achievements. In some embodiments, the process flow includes Game Over, Level Up, and Winner pages, which are optionally shown based on the performance of the user while playing.

Exemplary Flow 3: Rewards

In some embodiments, the process flow is the same as flow 1, except for the fact that the landing page gives rewards to the user. In further embodiments, the user is eventually is asked to enter an email address to collect the provided rewards (if the address wasn't already registered). In further embodiments, the user optionally collects rewards for their game achievements. In some embodiments, the process flow includes Game Over, Level Up, and Winner pages, which are optionally shown based on the performance of the user while playing.

Figure 10:
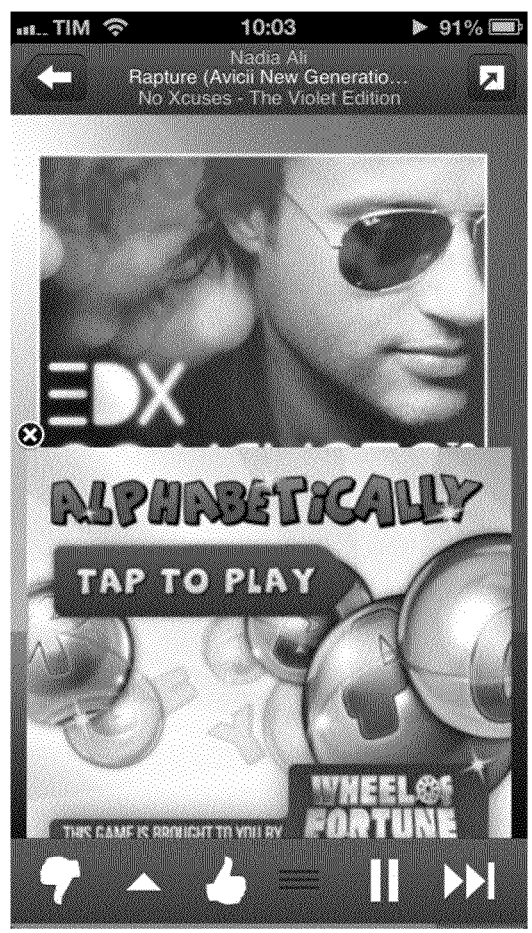
FIG. 10 shows a non-limiting example of a mobile ad unit described herein; in this case, a starting banner ad on a mobile music app.

Referring to FIG. 10, in a particular embodiment, an ad unit is a mobile ad unit such as a starting banner within a mobile music discovery application.

Figure 11:
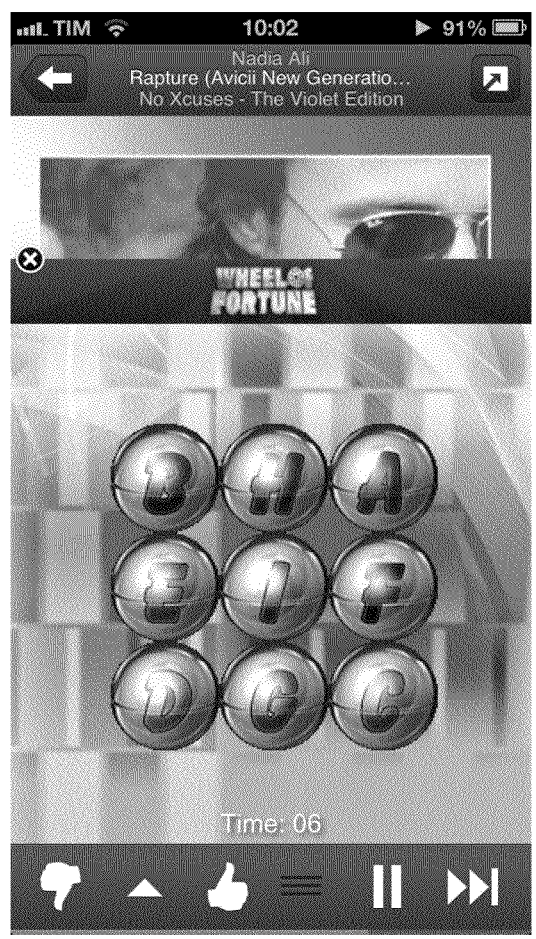
FIG. 11 shows a non-limiting example of an expanded ad unit; in this case, an expanded ad unit wherein a letter/word game has been loaded into the unit.

Referring to FIG. 11, in a particular embodiment, the user has tapped on the starting banner of FIG. 10 and the view has expanded itself. In this embodiment, a letter/word game has been loaded into the unit. Further in this embodiment, the game includes the brand's logo at the top.

Figure 12:
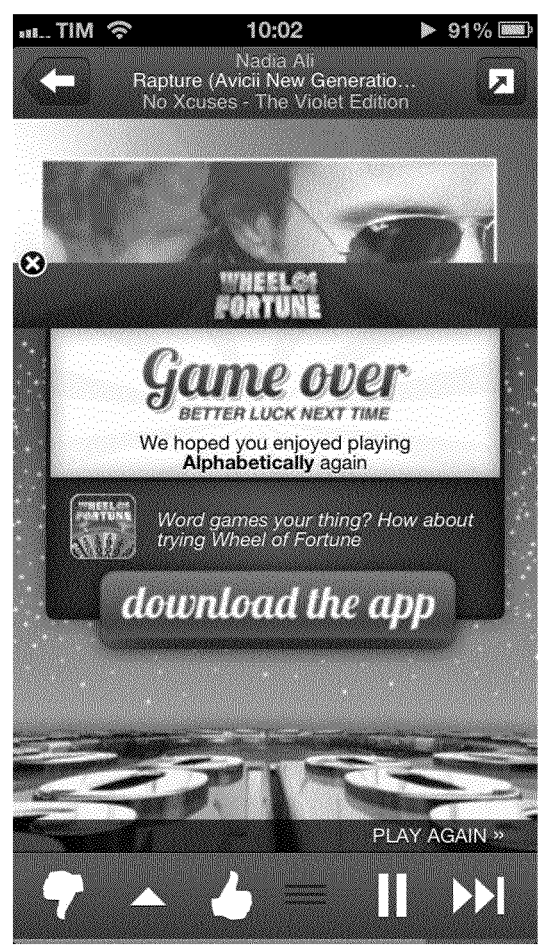
FIG. 12 shows a non-limiting example of a game fully contained with an expandable mobile ad unit; in this case, a game including a screen to display to users losing the game.

Referring to FIG. 12, in a particular embodiment, the user has concluded game play by losing the game, the "Game Over" landing page is shown, which includes a "Download" button and a "Play again" link. In this embodiment, the "Download" button provides access to a separate mobile app for the brand sponsoring the game.

Figure 13:
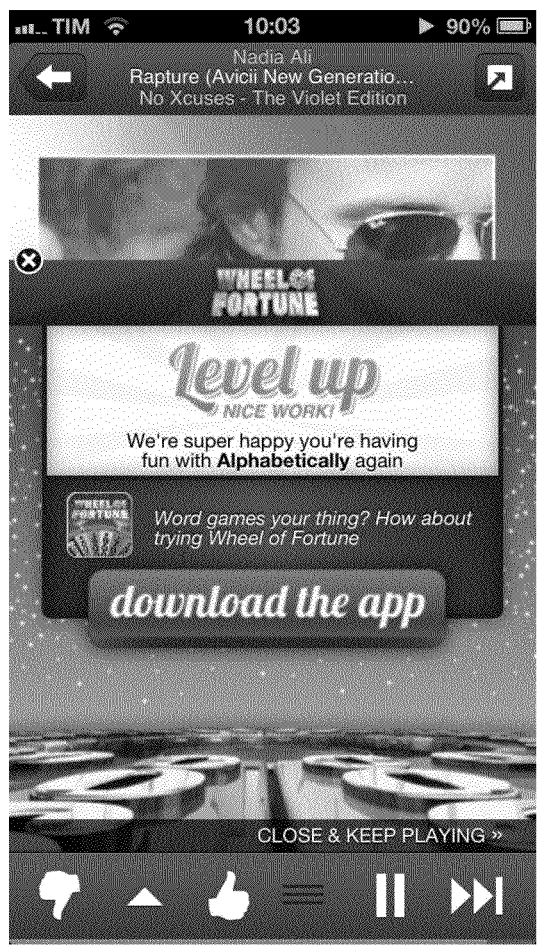
FIG. 13 shows a non-limiting example of a game fully contained with an expandable mobile ad unit; in this case, a game including a screen to display to users winning the game.

Referring to FIG. 13, in another particular embodiment, the user has concluded game play by winning the game, the "Level Up" landing page is shown, which includes a "Download" button and a "Close & keep playing" link to start a subsequent next level.

Figure 14:
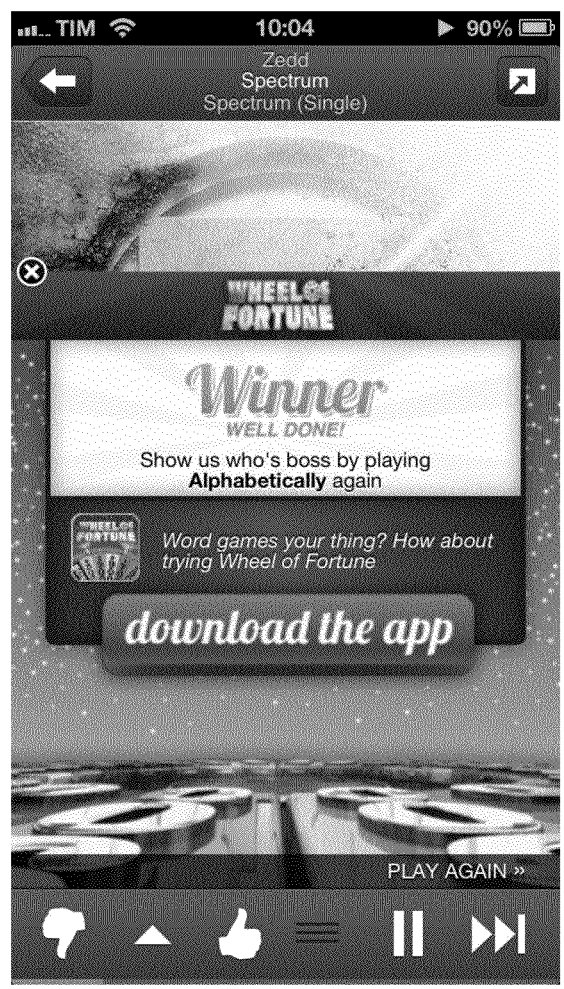
FIG. 14 shows a non-limiting example of a game fully contained with an expandable mobile ad unit; in this case, a game including a screen to display to users winning a series of matches within the game.

Referring to FIG. 14, in a further particular embodiment, the user has won three game play matches, the "Winner" landing page is shown, which includes a "Download" button and a "Play again" link to start the game from the beginning In each of FIGS. 11-14, the entire game is played within the expanded mobile ad unit.

Digital Processing Device

In some embodiments, the systems, software, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the systems, software, and methods disclosed herein include one or more non-transitory computer readable storage media encoded with a program including instructions executable by the operating system of an optionally networked digital processing device. In further embodiments, a non-transitory computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, software, and methods disclosed herein include at least one computer program, or use of the same. A computer program includes a sequence of instructions, executable in the digital processing device's CPU, written to perform a specified task. In light of the disclosure provided herein, those of skill in the art will recognize that a computer program may be written in various versions of various languages. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity Mobile Application In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages.

Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

The systems, software, and methods disclosed herein include, in various embodiments, software, server, and database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention claimed is:

1. Non-transitory computer-readable storage media encoded with a computer program including instructions executable by a processor to create an interactive mobile game, the game fully contained in a mobile embeddable unit, the embeddable unit expandable in response to a user interaction to provide the game, the game occupying at least 50 percent of the available area of a mobile display, provided that the game comprises a software module configured to transact in-game mobile micropayments; wherein the interactive mobile game is an action game, an adventure game, an arcade game, a board game, a brain game, a card game, a casino game, a dice game, a drawing game, an educational game, a music game, a puzzle game, a racing game, a role-playing game, a simulation, a social game, a sports game, a strategy game, a trivia game, a word game, or a combination thereof.

2. The storage media of claim 1, wherein the mobile embeddable unit is an ad unit.

3. The storage media of claim 2, wherein the mobile ad unit comprises text, an image, a video, an interactive, or a combination thereof.

4. The storage media of claim 2, wherein the mobile ad unit provides the interactive mobile game without linking to a web page or downloading a mobile application.

5. The storage media of claim 2, wherein the interactive mobile game occupies at least 70 percent or at least 90 percent of the available area of a mobile display.

6. The storage media of claim 5, wherein the interactive mobile game is full screen.

7. The storage media of claim 5, wherein the interactive mobile game is closable to reveal the mobile ad unit.

8. The storage media of claim 1, wherein the interactive mobile game comprises functionality to save game state and play information allowing a user to close the game and resume play at a later time.

9. The storage media of claim 8, wherein the game state and play information is saved to a remote server allowing a user to resume play from a different device or application.

10. A computer-implemented system comprising:
  a. a digital processing device comprising an operating system configured to perform executable instructions and a memory device;
  b. a computer program including instructions executable by the digital processing device to create an interactive mobile game, the game fully contained in a mobile embeddable unit, the embeddable unit expandable in response to a user interaction to provide the game, the game occupying at least 50 percent of the available area of a mobile display, provided that the game comprises a software module configured to transact in-game mobile micropayments; wherein the interactive mobile game is an action game, an adventure game, an arcade game, a board game, a brain game, a card game, a casino game, a dice game, a drawing game, an educational game, a music game, a puzzle game, a racing game, a role-playing game, a simulation, a social game, a sports game, a strategy game, a trivia game, a word game, or a combination thereof.

11. The system of claim 10, wherein the mobile embeddable unit is an ad unit.

12. The system of claim 11, wherein the mobile ad unit comprises text, an image, a video, an interactive, or a combination thereof.

13. The system of claim 11, wherein the mobile ad unit provides the interactive mobile game without linking to a web page or downloading a mobile application.

14. The system of claim 11, wherein the interactive mobile game occupies at least 70 percent or at least 90 percent of the available area of a mobile display.

15. The system of claim 14, wherein the interactive mobile game is full screen.

16. The system of claim 14, wherein the interactive mobile game is closable to reveal the mobile ad unit.

17. The system of claim 10, wherein the interactive mobile game comprises functionality to save game state and play information allowing a user to close the game and resume play at a later time.

18. The system of claim 17, wherein the game state and play information is saved to a remote server allowing a user to resume play from a different device or application.

* * * * *